(12) United States Patent
Srinivasan et al.

(10) Patent No.: US 11,243,194 B2
(45) Date of Patent: Feb. 8, 2022

(54) SUPPRESSORS WITH ELUENT SCREENS FOR USE IN ION CHROMATOGRAPHY

(71) Applicant: DIONEX CORPORATION, Sunnyvale, CA (US)

(72) Inventors: Kannan Srinivasan, Tracy, CA (US); Sheetal Bhardwaj, Fremont, CA (US); Glenn M. Kuse, Pleasanton, CA (US)

(73) Assignee: Dionex Corporation, Sunnyvale, CA (US)

( * ) Notice: Subject to any disclaimer, the term of this patent is extended or adjusted under 35 U.S.C. 154(b) by 6 days.

(21) Appl. No.: 16/258,285

(22) Filed: Jan. 25, 2019

(65) Prior Publication Data

US 2020/0240968 A1 Jul. 30, 2020

(51) Int. Cl.
*G01N 30/96* (2006.01)

(52) U.S. Cl.
CPC ....... *G01N 30/96* (2013.01); *G01N 2030/965* (2013.01)

(58) Field of Classification Search
CPC .......................... G01N 30/96; G01N 2030/965
See application file for complete search history.

(56) References Cited

U.S. PATENT DOCUMENTS

| | | | |
|---|---|---|---|
| 3,618,589 A | 11/1971 | Lorenzo | |
| 4,242,097 A | 12/1980 | Johnson et al. | |
| 4,265,634 A | 5/1981 | Pohl | |
| 4,290,775 A | 9/1981 | Stevens et al. | |
| 4,314,823 A | 2/1982 | Rich, Jr. et al. | |
| 4,474,664 A | 10/1984 | Stevens et al. | |
| 4,564,455 A | 1/1986 | Flynn et al. | |
| D291,185 S | 8/1987 | Stiso et al. | |
| D294,807 S | 3/1988 | Stiso et al. | |
| 4,751,189 A | 6/1988 | Rocklin | |
| 4,820,421 A | 4/1989 | Auerswald | |
| 4,999,098 A | 3/1991 | Pohl et al. | |
| 5,045,204 A | 9/1991 | Dasgupta et al. | |

(Continued)

FOREIGN PATENT DOCUMENTS

| | | |
|---|---|---|
| CN | 1403811 A | 3/2003 |
| CN | 1744945 A | 3/2006 |

(Continued)

OTHER PUBLICATIONS

Dionex Column Product Manual for IonPac AS22 IonPac AS22-Fast, Doc No. 065119-08, Mar. 2013, 63 pages.

(Continued)

*Primary Examiner* — Ryan B Huang

(57) ABSTRACT

A suppressor for use in reducing a background signal while detecting analytes in a liquid sample for ion chromatography is described. The suppressor includes a central channel and two flanking regenerant channels. The central channel is formed with an eluent channel plate including a central cutout portion having a peripheral boundary portion. The peripheral boundary portion includes a recessed eluent plate height that is less than the eluent plate height. The peripheral boundary portion includes two or more notches or protrusions. An eluent screen is disposed in the central cutout portion, in which a peripheral border of the eluent screen has two or more corresponding notches or corresponding protrusions to the eluent channel plate.

14 Claims, 8 Drawing Sheets

(56) References Cited

U.S. PATENT DOCUMENTS

| | | |
|---|---|---|
| 5,248,246 A | 9/1993 | Lew et al. |
| 5,248,426 A | 9/1993 | Stillian et al. |
| 5,352,360 A | 10/1994 | Stillian et al. |
| 5,423,965 A | 6/1995 | Kunz |
| 5,518,622 A | 5/1996 | Stillian et al. |
| 5,569,365 A | 10/1996 | Rabin et al. |
| 5,597,481 A | 1/1997 | Stillian et al. |
| 5,597,734 A | 1/1997 | Small et al. |
| 5,773,615 A | 6/1998 | Small et al. |
| 5,788,826 A | 8/1998 | Nyberg |
| 5,935,443 A | 8/1999 | Anderson, Jr. et al. |
| 6,077,434 A * | 6/2000 | Srinivasan ............. G01N 30/96 210/635 |
| 6,325,976 B1 | 12/2001 | Small et al. |
| 6,328,885 B1 | 12/2001 | Srinivasan et al. |
| 6,331,250 B1 | 12/2001 | Kaneko et al. |
| 6,425,284 B1 | 7/2002 | Srinivasan et al. |
| 6,436,719 B1 | 8/2002 | Srinivasan et al. |
| 6,444,475 B1 | 9/2002 | Anderson, Jr. et al. |
| 6,495,371 B2 | 12/2002 | Small et al. |
| 6,508,985 B2 | 1/2003 | Small et al. |
| 6,610,546 B1 | 8/2003 | Liu et al. |
| 7,399,415 B2 | 7/2008 | Srinivasan et al. |
| 7,473,354 B2 | 1/2009 | Liu et al. |
| 7,517,696 B2 | 4/2009 | Srinivasan et al. |
| 7,524,457 B2 | 4/2009 | Srinivasan et al. |
| D600,579 S | 9/2009 | Wounder |
| D602,168 S | 10/2009 | Hermansson et al. |
| D639,979 S | 6/2011 | Hermansson et al. |
| 8,216,515 B2 | 7/2012 | Liu et al. |
| 8,333,891 B2 | 12/2012 | Wyatt |
| 8,415,168 B2 | 4/2013 | Liu et al. |
| D688,805 S | 8/2013 | Page et al. |
| D746,469 S | 12/2015 | Okuda et al. |
| D746,987 S | 1/2016 | Okuda et al. |
| 2005/0034997 A1 | 2/2005 | Dimascio et al. |
| 2005/0258360 A1 | 11/2005 | Whitehouse et al. |
| 2006/0057733 A1 | 3/2006 | Liu et al. |
| 2006/0186046 A1 | 8/2006 | Liu et al. |
| 2006/0254969 A1 | 11/2006 | Yamanaka et al. |
| 2007/0051684 A1 | 3/2007 | Grebenyuk et al. |
| 2007/0062873 A1 | 3/2007 | Liu et al. |
| 2007/0266857 A1* | 11/2007 | Bentley ................. G01N 30/08 96/101 |
| 2008/0053830 A1 | 3/2008 | Tsonev et al. |
| 2008/0203029 A1 | 8/2008 | Deorkar et al. |
| 2008/0314750 A1 | 12/2008 | Hagner-McWhirter et al. |
| 2009/0127200 A1 | 5/2009 | Dasgupta et al. |
| 2009/0166293 A1 | 7/2009 | Srinivasan et al. |
| 2009/0308757 A1 | 12/2009 | Crettenand |
| 2013/0306565 A1 | 11/2013 | Davis |
| 2014/0134050 A1* | 5/2014 | Srinivasan ............. G01N 30/96 422/70 |
| 2014/0332387 A1 | 11/2014 | Srinivasan et al. |
| 2016/0187305 A1 | 6/2016 | Srinivasan et al. |

FOREIGN PATENT DOCUMENTS

| | | |
|---|---|---|
| CN | 101952717 A | 1/2011 |
| CN | 103969378 A | 8/2014 |
| EP | 0032770 B1 | 6/1984 |
| EP | 0180321 B1 | 2/1991 |
| EP | 0442224 A2 | 8/1991 |
| EP | 0555962 A2 | 8/1993 |
| EP | 2390660 A1 | 11/2011 |
| JP | 2013195301 A | 9/2013 |
| WO | WO-2004070377 A2 | 8/2004 |
| WO | WO-2006034182 A1 | 3/2006 |
| WO | WO-2008024500 A2 | 2/2008 |
| WO | WO-2012074455 A1 | 6/2012 |

OTHER PUBLICATIONS

Dionex Column Product Manual for IonPac AS23, Doc No. 065120-06, May 2013, 51 pages.

Dionex Column Product Manual IonPac AS15, Document No. 031362-10, Jun. 2014, 60 pages.

Dionex Product Manual ASRS(R) 300 CSRS(R) 300, Document No. 031956, Rev. 05, Aug. 2007, 51 pages.

Dionex Product Manual for ERS 500 Suppressor, Doc No. 031956-09, Nov. 2013, 69 pages.

Dionex Product Manual for aionPac(R) CG12A IonPac(R) CS12A, Doc No. 031132, Rev. 09, May 2010, 78 pages.

Dionex Product Manual IonPac AS18 Fast, Document No. 031878-08, Jun. 2012, 54 pages.

Douglas et al., "New suppressor technology improve trace level anion analysis with carbonate-hydrogencarbonate mobile phases," J Chrom A, 956(1-2), 2002, 47-51.

Saari-Nordhaus eta!., "Recent advances in ion chromatography suppressor improve anion separation and detection," J Chrom A, 956(1-2), (2002) 15-22.

Srinivasan eta., "Suppressor Design and Detection for Ion Chromatography" in: "Applications of Ion Chromatography for Pharmaceutical and Biological Products," Mar. 9, 2012, John Wiley & Sons, Inc., pp. 91-105.

U.S. Appl. No. 13/674,738, filed Nov. 12, 2012, to Srinivasan (specification, claims, abstract only).

* cited by examiner

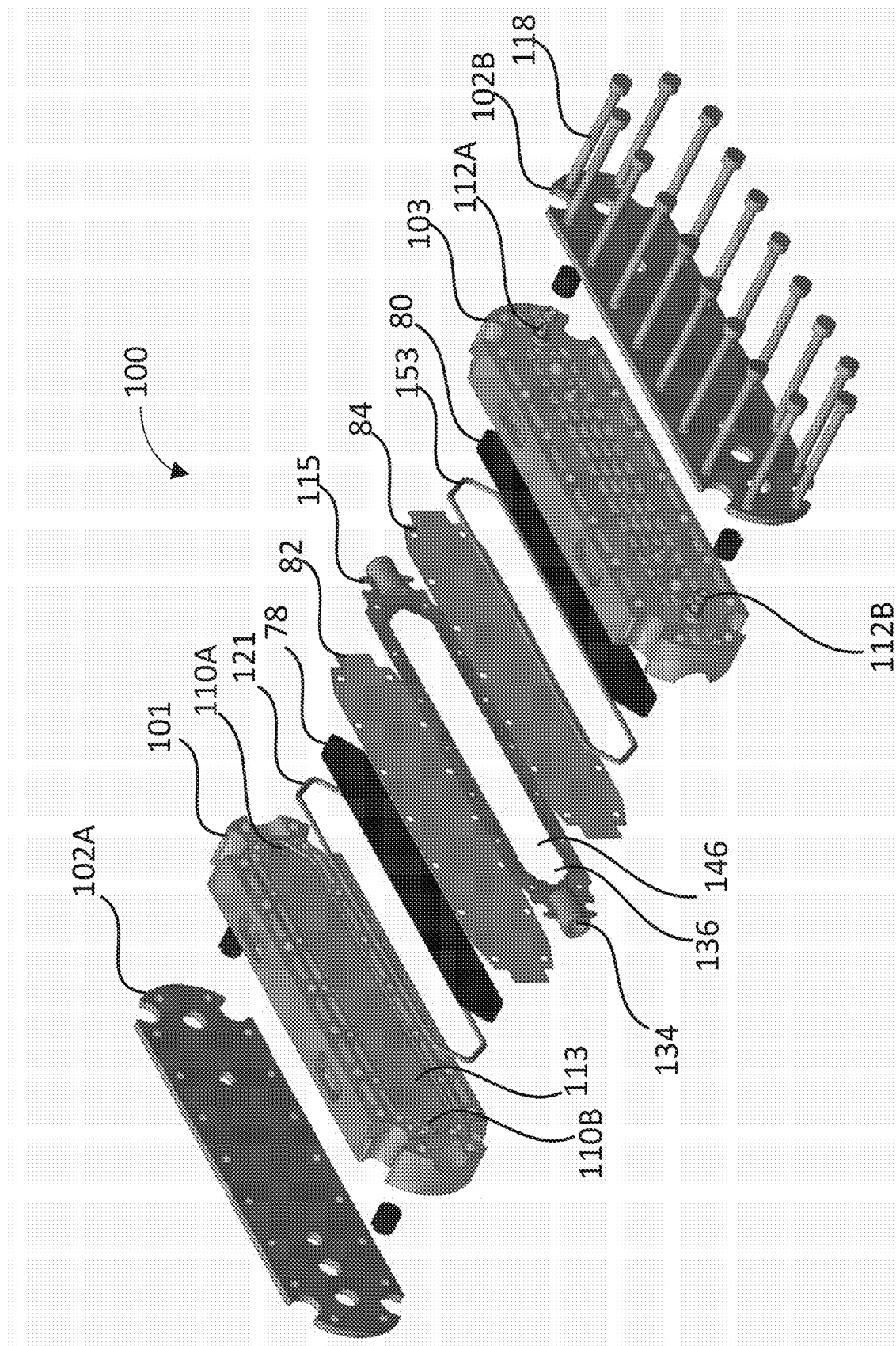

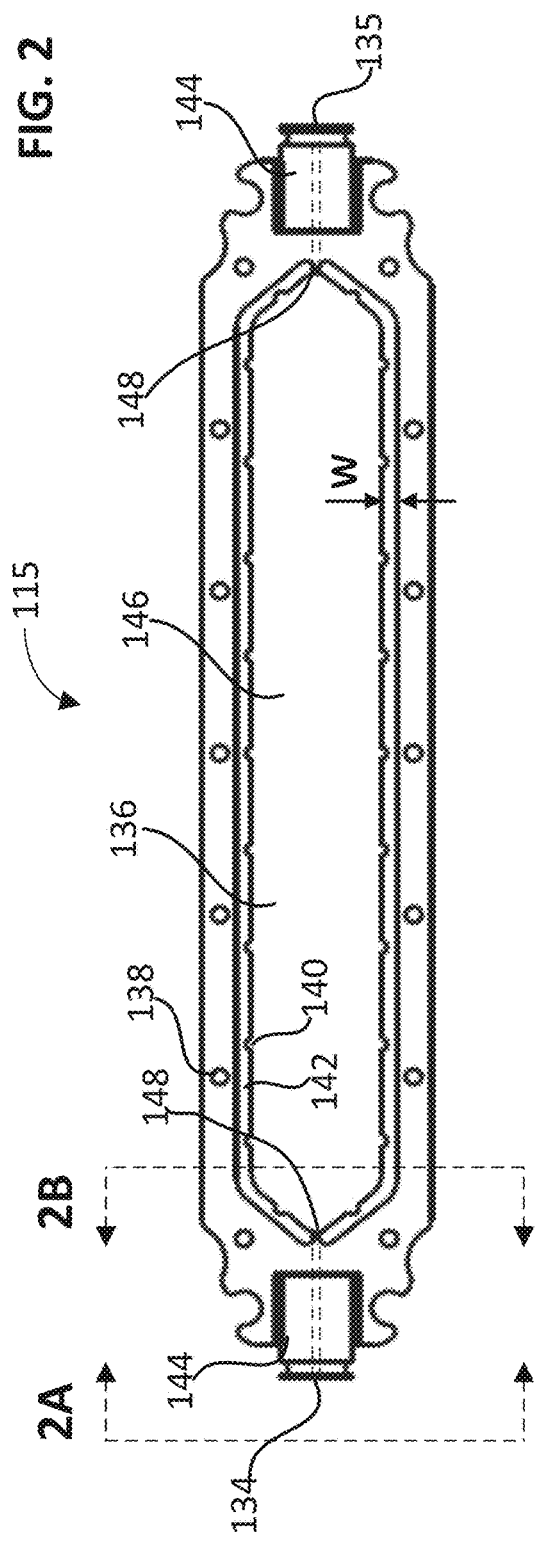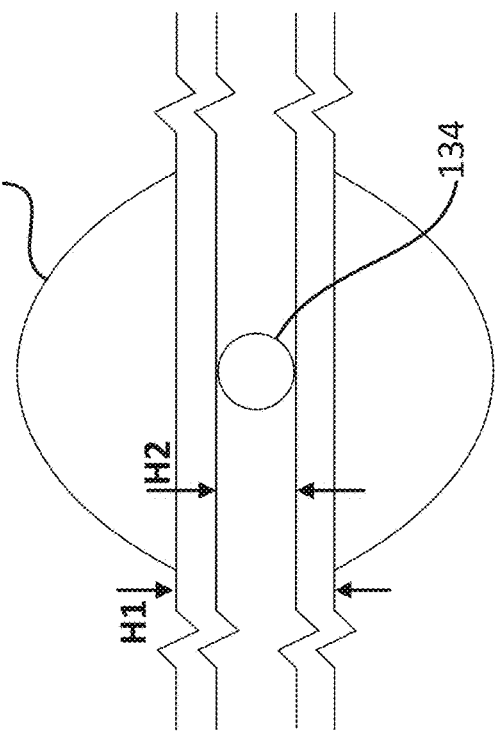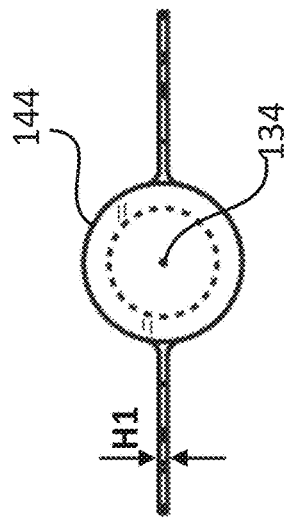

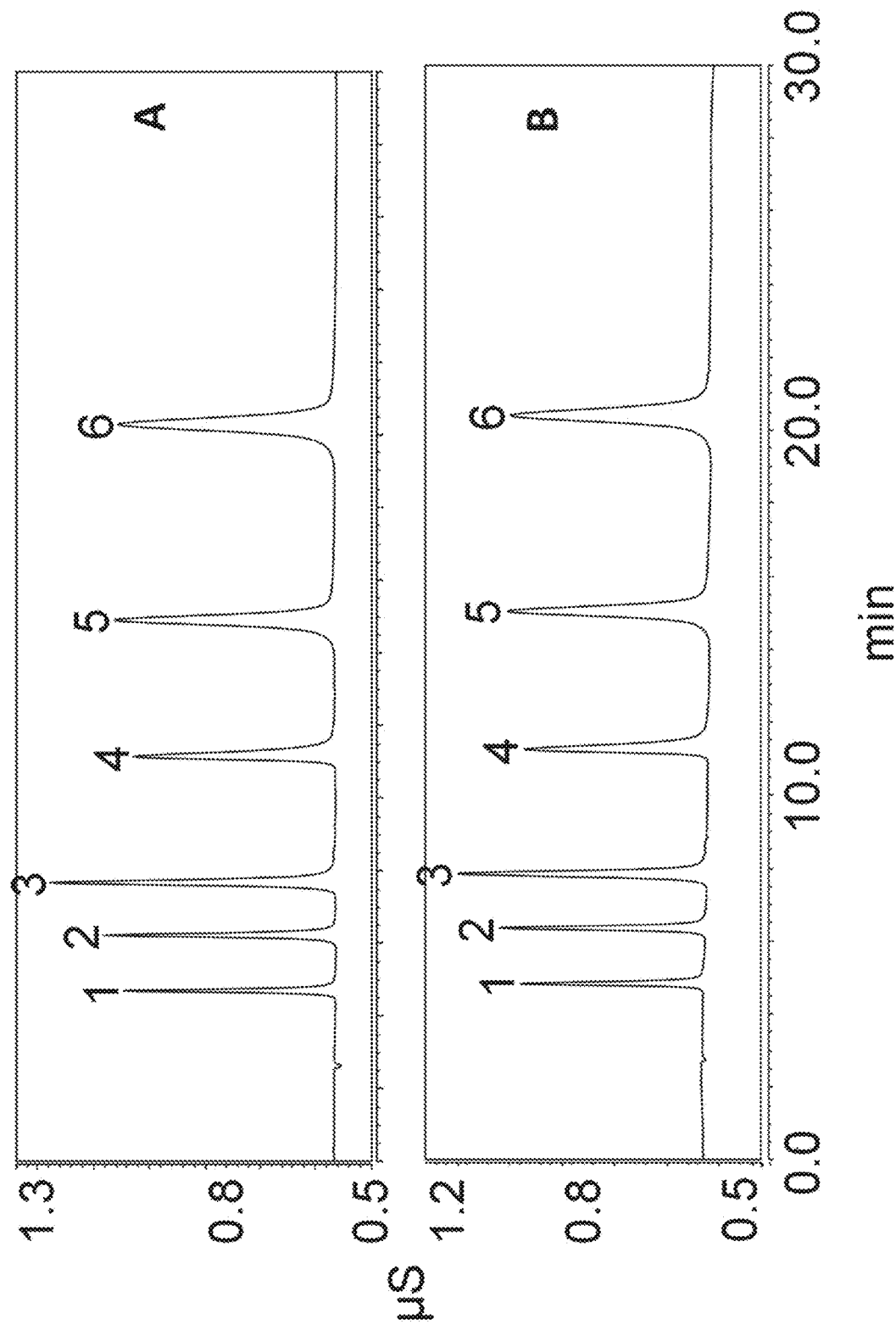

SUPPRESSORS WITH ELUENT SCREENS FOR USE IN ION CHROMATOGRAPHY

FIELD OF THE INVENTION

The invention generally relates to suppressor devices including eluent screens for use as a component in an ion chromatographic system that suppresses background signal.

BACKGROUND

Chromatography is a widely used analytical technique for the chemical analysis and separation of molecules. Chromatography involves the separation of one or more analyte species from other matrix components present in a sample. A stationary phase of a chromatography column is typically selected so that there is an interaction with the analyte. Such interactions can be ionic, hydrophilic, hydrophobic, or a combination thereof. For example, the stationary phase can be derivatized with ionic moieties that ideally will bind to ionic analytes and matrix components with varying levels of affinity. A mobile phase is percolated through the stationary phase and competes with the analyte and matrix components for binding to the ionic moieties. The mobile phase or eluent are terms used to describe a liquid solvent or buffer solution that is pumped through a chromatography column to elute the analyte and matrix components off of the stationary phase as a function of time and then be detected at a detector. Examples of some typical detectors are a conductivity detector, a UV-VIS spectrophotometer, and a mass spectrometer. Over the years, chromatography has developed into a powerful analytical tool that is useful for creating a healthier, cleaner, and safer environment where complex sample mixtures can be separated and analyzed for various industries such as water quality, environmental monitoring, food analysis, pharmaceutical, and biotechnology.

Typically, the eluent used to separate a sample is highly conductive. Under certain circumstances where a conductivity detector is used, the eluent can contribute to a significant background signal compared to the signal of the analyte. A suppressor can be used to remove a conductive component of the eluent and convert the eluent to a weakly dissociated form and this enables detection of ions with high a signal to noise ratio. The suppressor can be positioned downstream of the chromatography column and upstream of the conductivity detector.

Suppressors may be in a three-channel format where there is a central channel flanked by two adjacent regenerant channels. The regenerant channels can be on opposing sides of the central channel. For electrolytic suppressors, there is an electrode disposed in each of the regenerant channels for generating regenerant ions that are transported to the central channel. For chemical suppressors, a chemical regenerant fluid is flowed in the regenerant channels for providing regenerant ions that are transported to the central channel or for facilitating the removal of ions from the central channel. An ion exchange material or ion exchange screen can be disposed in the central channel for facilitating the suppressor function. For circumstances requiring suppression under relatively high-pressures, Applicant believes that there is a need to develop better suppressors that can be manufactured in a robust manner and have relatively low band dispersion.

SUMMARY

In a first embodiment, a suppressor for use in reducing a background signal while detecting analytes in a liquid sample for ion chromatography is described. The suppressor includes a first block, a first ion exchange membrane, an eluent channel plate, a second ion exchange membrane, and a second block. The first block includes a first compartment, a first sealing member disposed along a periphery of the first compartment, a first screen disposed in the first compartment, a first inlet, a first outlet, and an optional first electrode disposed in the first compartment. The first ion exchange membrane is capable of passing ions of only one charge, positive or negative, and of blocking a bulk liquid flow. The eluent channel plate includes a central cutout portion, an eluent screen, an inlet hole, and an outlet hole. The central cutout portion having a peripheral boundary portion that includes two or more notches or protrusions. The eluent channel plate includes an eluent channel plate height and the peripheral boundary portion includes a recessed eluent channel plate height that is less than the eluent channel plate height. The eluent channel plate height and the recessed eluent channel plate height are in a perpendicular orientation to a plane of the eluent channel plate. The eluent screen can be disposed in the central cutout portion. A peripheral border of the eluent screen can have two or more corresponding notches or corresponding protrusions to the eluent channel plate. The inlet hole can be located at a first end face of the eluent channel plate, in which the inlet hole is fluidically connected to the central cutout portion. The outlet hole can be located at a second end face of the eluent channel plate, in which the outlet hole is fluidically connected to the central cutout portion. The second ion exchange membrane is capable of passing ions of only one charge, positive or negative, and of blocking a bulk liquid flow. The first ion exchange membrane and the second ion exchange membrane can have a same charge. The second block includes a second compartment, a second sealing member disposed along a periphery of the second compartment, a second screen disposed in the second compartment, a second inlet, a second outlet, and an optional second electrode disposed in the second compartment. The first ion exchange membrane is disposed between the first block and a first side of the eluent channel plate. The first compartment, the first sealing member, and the first ion exchange membrane form a first regenerant channel and fluidically seal the first regenerant channel along the periphery of the first compartment. The second ion exchange membrane is disposed between the second block and a second side of the eluent channel plate. The second side of the eluent channel plate being on an opposing side to the first side of the eluent channel plate. The second compartment, the second sealing member, and the second ion exchange membrane form a second regenerant channel and fluidically seal the second regenerant channel along the periphery of the second compartment. The first ion exchange membrane, the central cutout portion, and the second ion exchange membrane are sandwiched together to form an eluent channel, hold the eluent screen in the eluent channel, and fluidically seal the eluent channel along the peripheral boundary portion.

In a second embodiment, a suppressor for use in reducing a background signal while detecting analytes in a liquid sample for ion chromatography is described. The suppressor includes a first block, an optional first electrode, a first elastomeric screen layer, a first ion exchange membrane, an eluent channel plate, a second ion exchange membrane, a second elastomeric screen layer, an optional second electrode, and a second block. The first block includes an inlet and an outlet. The first elastomeric screen layer includes a first elastomeric layer having a first cutout. A first screen can be integrated into the first elastomeric layer where the first screen spans at least the first cutout. The first ion exchange membrane is capable of passing ions of only one charge, positive or negative, and of blocking a bulk liquid flow. The eluent channel plate includes a central cutout portion, an eluent screen, an inlet hole, and an outlet hole. The central cutout portion having a peripheral boundary portion that includes two or more notches or protrusions. The eluent channel plate includes an eluent channel plate height and the peripheral boundary portion includes a recessed eluent channel plate height that is less than the eluent channel plate height. The eluent channel plate height and the recessed eluent channel plate height are in a perpendicular orientation to a plane of the eluent channel plate. The eluent screen can be disposed in the central cutout portion. A peripheral border of the eluent screen can have two or more corresponding notches or corresponding protrusions to the eluent channel plate. The inlet hole can be located at a first end face of the eluent channel plate, in which the inlet hole is fluidically connected to the central cutout portion. The outlet hole can be located at a second end face of the eluent channel plate, in which the outlet hole is fluidically connected to the central cutout portion. The second ion exchange membrane is capable of passing ions of only one charge, positive or negative, and of blocking a bulk liquid flow. The first ion exchange membrane and the second ion exchange membrane can have a same charge. The second elastomeric screen layer includes a second elastomeric layer having a second cutout. A second screen can be integrated into the second elastomeric layer where the second screen spans at least the second cutout. The second block includes an inlet and an outlet. The first ion exchange membrane is disposed between the first elastomeric screen layer and a first side of the eluent channel plate. The first block, the first elastomeric screen layer, and the first ion exchange membrane form a first regenerant channel and fluidically seal the first regenerant channel along a periphery of the first cutout. The second ion exchange membrane is disposed between the second elastomeric screen layer and a second side of the eluent channel plate. The second side of the eluent channel plate being on an opposing side to the first side of the eluent channel plate. The second block, the second elastomeric screen layer, and the second ion exchange membrane form a second regenerant channel and fluidically seal the second regenerant channel along a periphery of the second cutout. The first ion exchange membrane, the central cutout portion, and the second ion exchange membrane form an eluent channel, hold the eluent screen in the eluent channel, and fluidically seal the eluent channel along the peripheral boundary portion.

In a third embodiment, a suppressor for use in reducing a background signal while detecting analytes in a liquid sample for ion chromatography is described. The suppressor can include a first regenerant channel, a first ion exchange membrane, an eluent channel plate, a second ion exchange membrane, and a second regenerant channel. The first regenerant channel includes a first inlet and a first outlet. The first ion exchange membrane is capable of passing ions of only one charge, positive or negative, and of blocking a bulk liquid flow. The eluent channel plate includes a central cutout portion, an eluent screen, an inlet hole, and an outlet hole. The central cutout portion can have a peripheral boundary portion that includes two or more notches or protrusions. The eluent channel plate includes an eluent channel plate height and the peripheral boundary portion includes a recessed eluent channel plate height less than the eluent channel plate height. The eluent channel plate height and the recessed eluent channel plate height are in a perpendicular orientation to a plane of the eluent channel plate. The eluent screen can be disposed in the central cutout portion, in which a peripheral border of the eluent screen has two or more corresponding notches or corresponding protrusions to the eluent channel plate. The inlet hole can be located at a first end face of the eluent channel plate, in which the inlet hole is fluidically connected to the central cutout portion. The outlet hole can be located at a second end face of the eluent channel plate, in which the outlet hole is fluidically connected to the central cutout portion. The second ion exchange membrane is capable of passing ions of only one charge, positive or negative, and of blocking a bulk liquid flow. The first ion exchange membrane and the second ion exchange membrane can have a same charge. The second regenerant channel includes a second inlet; and a second outlet. The first ion exchange membrane can be disposed between the first regenerant channel and a first side of the eluent channel plate. The second ion exchange membrane can be disposed between the second regenerant channel and a second side of the eluent channel plate. The second side is on an opposing side to the first side. The first ion exchange membrane, the central cutout portion, and the second ion exchange membrane are sandwiched together to form an eluent channel, hold the eluent screen in the eluent channel, and fluidically seal the eluent channel along the peripheral boundary portion.

In regards to the first embodiment, the first block further includes a first electrode disposed in the first compartment, and the second block further includes a second electrode disposed in the second compartment.

In regards to the second embodiment, the suppressor further includes a first electrode disposed against the first block, in which the first elastomeric screen layer is disposed against the first electrode. A second electrode disposed against the second block, in which the second elastomeric screen layer is disposed against the second electrode.

In regards to the third embodiment, the suppressor further includes a first electrode disposed in the first regenerant channel and a second electrode disposed in the second regenerant channel.

In regards to any of the above embodiments, the first ion exchange membrane can be urged against the first side of the eluent channel plate so that the first ion exchange membrane touches a first side of the peripheral boundary portion. The second ion exchange membrane can be urged against the second side of the eluent channel plate so that the second ion exchange membrane touches a second side of the peripheral boundary portion. The second side of the peripheral boundary portion being on an opposing side to the first side of the peripheral boundary portion.

In regards to any of the above embodiments, the first ion exchange membrane can touch the peripheral boundary portion and the corresponding notches or the corresponding protrusions of the eluent screen. The second ion exchange membrane can also touch the peripheral boundary portion and the corresponding notches or the corresponding protrusions of the eluent screen.

In regards to any of the above embodiments, the eluent screen can have an eluent screen height in the perpendicular orientation to the plane of the eluent channel plate. The eluent screen height can be about equal to the recessed eluent channel plate height.

In regards to the first embodiment, the first block can further include a first groove formed in the first block along the periphery of the first compartment and the first sealing member is disposed in the first groove. The second block can further include a second groove formed in the second block along the periphery of the second compartment and the second sealing member is disposed in the second groove.

In regards to any of the above embodiments, the inlet hole and the outlet hole can be both aligned along a longitudinal axis parallel to the plane of the eluent channel plate.

In regards to the first embodiment, the first sealing member is a first o-ring and the second sealing member is a second o-ring.

In regards to the first embodiment, the first o-ring and the second o-ring are both formed from a first elastomeric cord and a second elastomeric cord, respectively.

In regards to the first embodiment, the periphery of the first compartment can include a first plurality of pins configured to pierce and immobilize the first elastomeric cord. The periphery of the second compartment can include a second plurality of pins configured to pierce and immobilize the second elastomeric cord.

In a fourth embodiment, a method of suppressing an eluent stream using a suppressor is described. The eluent stream incudes an eluent and an analyte, in which the eluent comprises an eluent ion and an eluent counterion. The suppressor in the fourth embodiment may be any one of the above embodiments. The method includes flowing the eluent stream through the eluent channel. An aqueous stream can flow through the first regenerant channel and the second regenerant channel. At least a portion of the eluent counterion can be transferred, but not the analyte from the eluent channel to the first regenerant channel. A regenerant ion from the second regenerant channel can be concomitantly transferred from the second regenerant channel to the eluent channel.

In regards to the fourth embodiment that uses a suppressor that includes the first electrode and the second electrode, the method further includes applying a voltage or a current between the first electrode and the second electrode.

In regards to the fourth embodiment that uses a suppressor that includes the first electrode and the second electrode, the applied voltage or current causes the electrolysis of water to generate regenerant ions. The regenerant ions may be hydroxide and/or hydronium.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

FIG. 1 is an exploded perspective view of a suppressor.

FIG. 2 is a top plan view of an eluent channel plate in accordance with the suppressor of FIG. 1.

FIG. 2A is a front end view of the eluent channel plate that illustrates a fluidic port hole extending through a portion of the eluent channel plate in accordance with the viewpoint 2A of FIG. 1.

FIG. 2B is a cross-sectional view of the fluidic port hole extending through the eluent channel plate in accordance with the viewpoint 2B of FIG. 1.

FIG. 8 shows two chromatograms that analyze six cations comparing the use of a chemical cation suppressor in a format similar to FIG. 1 (see chromatogram A) compared to the reference chemical suppressor with ion exchange resin in the central channel (see chromatogram B).

DETAILED DESCRIPTION OF EMBODIMENTS

Figure 3:
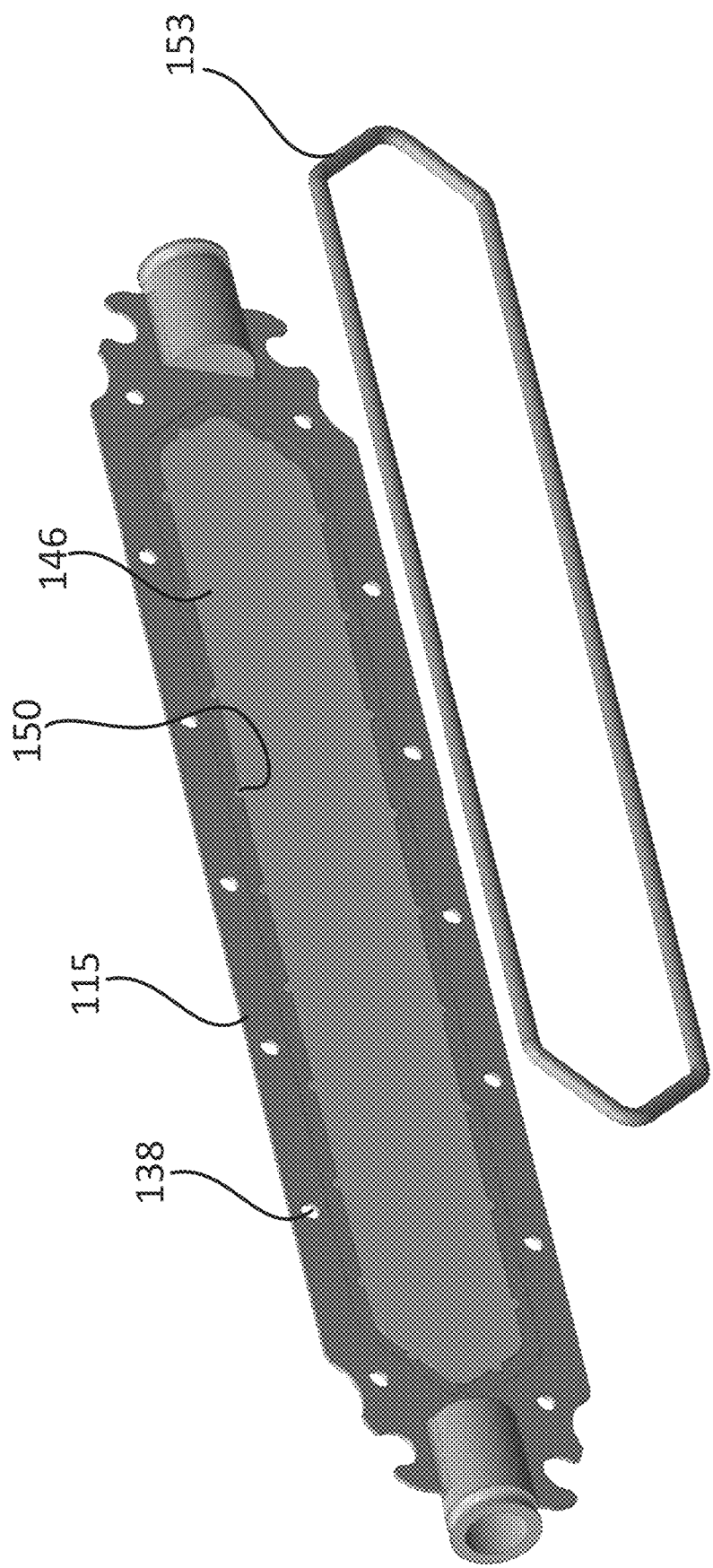
FIG. 3 is a perspective view of the eluent channel plate, a screen, and the unassembled sealing member in accordance with the suppressor of FIG. 1.
Figure 4:
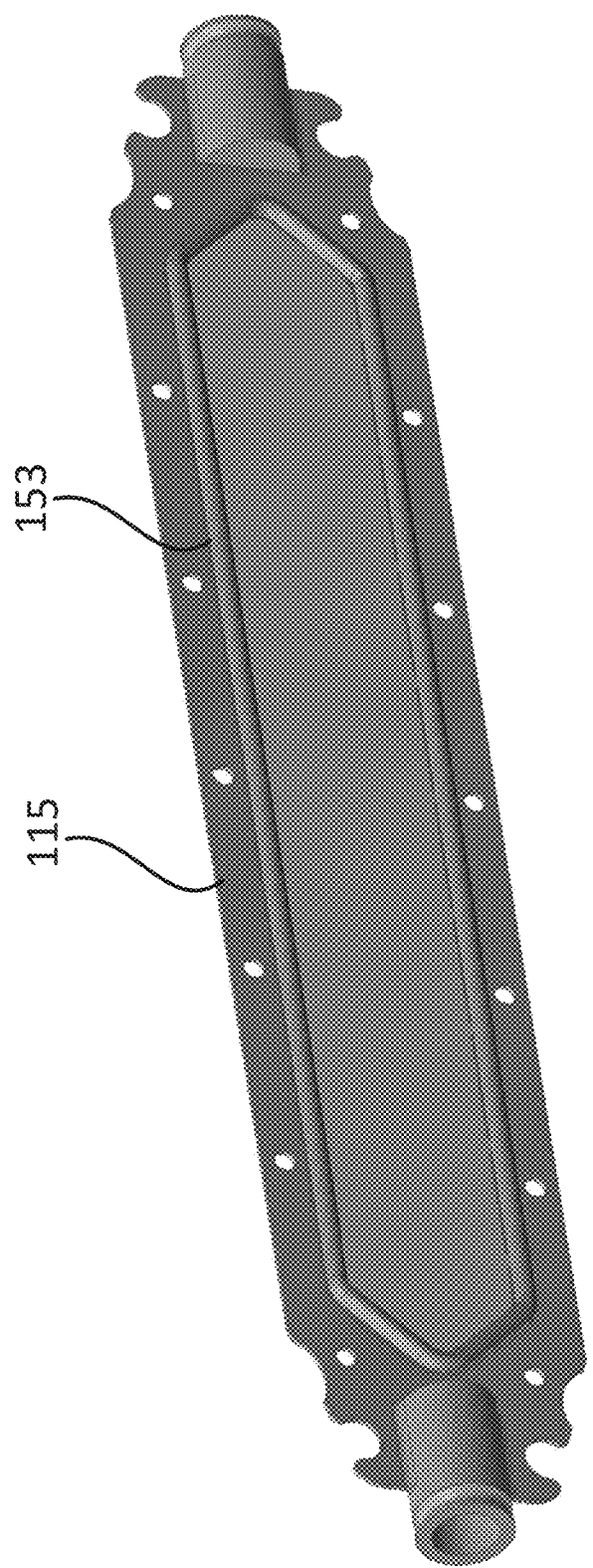
FIG. 4 is a perspective view of the eluent channel plate, the screen, and the sealing member biased against a corresponding peripheral boundary portion of the eluent channel plate to illustrate the corresponding shapes of the sealing member and the peripheral boundary portion. An ion exchange membrane may be disposed in between the sealing member and the eluent channel plate.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

For circumstances requiring suppression under relatively high-pressures, the suppressor can have a central eluent channel formed with a relatively non-compressible polymer plate (e.g., PEEK polymer). However, polymer plates having a channel height of about 0.015" were found to be incompatible with smaller height ion exchange screens. Applicant found that leaving a sufficiently large open area in the 0.015" channel height that was unoccupied by a screen caused increased band dispersion and reduced the accuracy of the ion measurements. Applicant also found reducing the height of the polymer plate to the same height of typical ion exchange screens made the polymer plate fragile so that it was difficult to form a fluidic inlet and outlet in the eluent plate. Another challenge with placing a screen in the eluent cavity is to ensure a proper seal of a peripheral portion of the screen to the cavity dimensions. If the screen is not sealed properly, a fluidic bypass can form around the screen and the suppression of the eluent can be compromised.

In another embodiment, ion exchange resin can be used instead of ion exchange screens in the central eluent channel. However, adding small amounts of ion exchange resin into a relatively small central eluent channel can be challenging to do without encountering a manufacturing error. If excess ion exchange resin is added just outside of the central eluent channel, this may cause a fluidic leak in the sealing mechanism. For this reason, under certain circumstances, it is desirable to use ion exchange screens instead of ion exchange resin for relatively high-pressure applications.

In an embodiment, the eluent channel can be modified to have a thinned out reduced height periphery for only a portion of the eluent plate to accommodate an ion exchange screen and to form a leak free seal with compression on both sides of the screen. An elastomeric seal in the regenerant channel indirectly provides a seal for the screen on the perimeter of the eluent channel and also provides a seal for the regenerant and one side of the eluent channel. Additionally, the eluent channel dimension is thinned out in the vicinity of the elastomeric seal to accommodate various screen dimensions that are useful for an eluent screen for a suppressor module. The elastomeric seal compensates for the dimensional variation of the eluent channel and provides a leak free seal. An elastomeric sealing member with tubular shape from VITON™ elastomer may be used with an outer diameter of 0.062". The eluent channel plate was thinned out in the outer perimeter of the channel where the elastomeric seal resides to roughly a height of 0.008" and a width of 0.062" which is the diameter of the seal. The notches were made on the perimeter at some distance apart to hold the screen in place.

FIG. 1 is a simplified exploded perspective view of a suppressor 100. Suppressor 100 may include a first plate 102A, a first block 101, an optional first electrode 78, a first ion exchange membrane 82, an eluent channel plate 115, a second ion exchange membrane 84, an optional second electrode 80, a second block 103, and a second plate 102B. The two plates 102A and 102B are the two outermost layers used to hold the various components of the suppressor together. A plurality of screws 118 are used to fasten the two plates 102A and 102B together along with various intervening components. The plurality of screws 118 may go through various holes on first plate 102A, first block 101, first ion exchange membrane 82, eluent channel plate 115, second ion exchange membrane 84, second block 103, and second plate 102B to bind together. For eluent channel plate 115, hole 138 is labeled in FIG. 2. In an embodiment, the two plates 102A and 102B may be stainless steel.

First block 101 may include a first compartment 113 to partly form a first regenerant channel. First compartment 113 can be a recessed area and have a hexagonal shape along with two ports 110A and 110B on approximately opposing ends of the first regenerant channel. The two ports 110A and 110B are configured to be an input or output for a regenerant liquid. First compartment 113 can include another port so that an electrical cable can go through the first block 101 to electrically couple to a first electrode 78 disposed in the first regenerant channel.

Second block 103 is similar to first block 101 in that it includes a second compartment to partly form a second regenerant channel. The second compartment can be a recessed area and have a hexagonal shape along with two ports 112A and 112B on approximately opposing ends of the second compartment. The two ports 112A and 112B are configured to be an input or output for a regenerant liquid. The second compartment can include another port so that an electrical cable can go through the second block 103 to electrically couple to a second electrode 80 disposed in the second regenerant channel. In an embodiment, the first block 101 and the second block 103 can both be a polyetheretherketone material.

A first sealing member 121 and a second sealing member 153 can each be configured to have an approximately hexagonal shape that corresponds to the outer boundary of the first compartment 113 and the second compartment, respectively. The first sealing member 121 and the second sealing member 153 each help form a liquid seal for the first compartment 113 and the second compartment, respectively. In an embodiment, the first sealing member 121 and the second sealing member 153 can each be in the form of an o-ring.

In an embodiment, the first o-ring and the second o-ring can both be formed from a first elastomeric cord and a second elastomeric cord, respectively. The elastomeric cord can be an elastomeric tubular line segment having a first end and a second end. The periphery of the first compartment can include a first plurality of pins configured to pierce and immobilize the first elastomeric cord, and the periphery of the second compartment can include a second plurality of pins configured to pierce and immobilize the second elastomeric cord. The first end of the elastomeric tubular line segment can overlap with the second end so that the elastomeric tubular line segment can indirectly seal the entire peripheral boundary 142 on one side of the eluent channel plate per o-ring. The o-ring urges the ion exchange membrane against the eluent channel plate.

First electrode 78 may be disposed in the first compartment 113 of first block 101. Similarly, second electrode 80 may be disposed in the second compartment of second block 103. The electrodes should be made of a material suitable for being stable while electrolyzing water such as for example a noble metal, platinum, or gold. In an embodiment, the electrode may be a layer of a noble metal on a conductive surface. The electrode may be a mesh, wire, or plate format.

The first screen may be disposed in the first compartment 113 before or after placing first electrode 78 in the first compartment 113. Similarly, a second screen may be disposed in the second compartment. In an embodiment, the first screen and the second screen may be disposed against or on the first sealing member and the second sealing member, respectively. Screens may be used to facilitate diffusion of ions in the channel. In an embodiment, the screen can be functionalized with ion exchange sites. In another embodiment, the screens can be weakly functionalized with ion exchange sites or have essentially no ion exchange sites. In an alternative embodiment, multiple screens may be used in a single compartment provided that they fill the compartment substantially. More details regarding screens in suppressors can be found in U.S. Pat. Nos. 6,077,434 and 4,999,098, which are hereby incorporated by reference herein. In an embodiment, a screen can be a mesh with a crisscross pattern of thin fibers having a diameter of 110 μm (about 0.004 inches). The flow channel may preferably have an open area of 5% to 70%, and more preferably from around 10 to 50%. Smaller open area screens can be preferably used in the eluent channel where chromatographic properties are critical and the efficiency of the separated peaks from the chromatography need to be preserved. The eluent screen opening can be preferably in the less than 0.010 inch to more preferably in the less than 0.006 inch. The mesh count per inch can be preferably less than 200 and more preferably less than 125. In an embodiment, the height of the screen may be less than 0.020".

Similarly, larger open area screens are preferred for the regenerant channels where the regenerant flows and would reduce the restriction and increase the transport of ions. The regenerant screen opening can be preferably in the less than 0.030 inch to more preferably in the less than 0.020 inch.

The mesh count per inch can be preferably less than 100 and more preferably less than 50. The height of the screen is preferably less than 0.04" for the regenerant channel.

An ion exchange barrier may be in the form of an ion exchange membrane (82 or 84) and forms a portion of the regenerant channel. The boundary of the first regenerant channel can be formed by the first compartment 113 in first block 101, the first sealing member 121, and the first ion exchange membrane 82. Similarly, the boundary of the second regenerant channel can be formed by the second compartment in second block 103, the second sealing member 153, and the second ion exchange membrane 84. The ion exchange barrier can have one polarity of charge so that it can bind ions of the opposite change. In addition, the ion exchange barrier is capable of passing ions of only one charge, positive or negative, and of blocking bulk liquid flow. For example, a cation exchange membrane can be negatively charged and contain cations such as sodium or potassium. The cation exchange barrier is configured to allow cations to flow through, but block the bulk flow of liquid. Under an applied electrical field, cations can migrate across cation exchange membrane and combine with hydroxide ions generated at the cathode. An example of a cation exchange membrane is sulfonated tetrafluoroethylene based fluoropolymer-copolymer (Nafion® polymer). In another embodiment, the ion exchange membrane can be a Teflon® sheet derivatized with ion exchange moieties.

Eluent channel plate 115 can have a hexagonal shaped central cutout portion 136 that forms part of a central channel, as illustrated in FIG. 2. The eluent channel plate 115 can have two cylindrical portions 144 on opposing ends of the eluent channel plate 115, as illustrated in FIGS. 2, 2A, and 2B. Two cylindrical portions 144 can incorporate two ports 134 and 135 that can be used as an inlet hole and an outlet hole. The inlet hole can be located at a first end face of the eluent channel plate, in which the inlet hole (134 or 135) can be fluidically connected to the central cutout portion 136. Similarly, the outlet hole (134 or 135) can be located at a second end face of the eluent channel plate that opposes the first end face where the outlet hole can be fluidically connected to the central cutout portion 136.

The eluent channel plate 115 may be formed using a piece of PEEK material. In an embodiment, the hexagonal shaped central cutout portion 136 approximately corresponds to the shape of the hexagonal portion for the first compartment 113 and the second compartment. A central cutout portion 136 has a peripheral boundary portion 142. In an embodiment, the peripheral boundary portion 142 may include a plurality of notches 140, as illustrated in FIG. 2. In another embodiment, the peripheral boundary portion 142 may include a plurality of protrusions (not shown). The number of notches or protrusions on the peripheral boundary portion 142 may range from 2 or more, preferably range from about 2 to about 50, and more preferably range from about 10 to 30. The notches or protrusions may have a dimension of 0.005" to 0.1" in the longest dimension (e.g. a radius of semicircle, a side of rectangle, distance from vertex to base of triangle). The notches or protrusions can have the shape of a semicircle, triangle, or rectangle. The peripheral boundary portion 142 has a width W, as illustrated in FIG. 2 where the width W approximately corresponds to the width or diameter of the sealing member. For example, the width W and the diameter of the tubing of the o-ring can both be approximately 0.062". Alternatively, the width W may be less than the diameter of the tubing of the o-ring so long as there is a sufficient fluidic seal of the suppressor. In an embodiment, the longest dimension of the notches or protrusions may be measured in a distance parallel to the width W. In another embodiment, the longest dimension of the notches or protrusions may be measured in a distance perpendicular to the width W.

The eluent channel plate 115 includes an eluent channel plate height H1 and the peripheral boundary portion 142 includes a recessed eluent channel plate height H2, as illustrated in FIG. 2B. The recessed eluent channel plate height H2 is less than the eluent channel plate height H1. The eluent channel plate height and the recessed eluent channel plate height can be measured in a perpendicular orientation to a plane of the eluent channel plate 115. Eluent channel plate height H1 may range from 0.001" to 0.5", and preferably from 0.007" to 0.02". The recessed eluent channel plate height H2 may range from 0.0008" to 0.1", and preferably from 0.005" to 0.01". The diameter of port 134 or 135 can range from 0.0003" to 0.08" so long as the diameter is about the same as or less than the recessed eluent channel plate height H2.

An eluent screen 146 is disposed in the central cutout portion, as illustrated in FIGS. 2 and 3. In an embodiment, the peripheral border of the eluent screen 146 may include a plurality of protrusions 150 that correspond to the notches 140 of peripheral boundary portion 142. In another embodiment, the peripheral border of the eluent screen 146 may include may include a plurality of notches that correspond to the protrusions of peripheral boundary portion 142. The number of notches or protrusions on the peripheral border of the eluent screen 146 may range from 2 or more, preferably range from about 2 to about 50, and more preferably range from about 10 to 30. The notches or protrusions of the eluent screen may have similar dimensions to the corresponding notches or corresponding protrusions of the eluent channel plate. The notches or protrusions of the eluent screen may have a dimension of 0.005" to 0.1" in the longest dimension (e.g. a radius of semicircle, a side of rectangle, distance from vertex to base of triangle). The notches or protrusions of the eluent screen can have the shape of a semicircle, triangle, or rectangle. In an embodiment, the longest dimension of the notches or protrusions may be measured in a distance parallel to the width W. In another embodiment, the longest dimension of the notches or protrusions may be measured in a distance perpendicular to the width W.

The first ion exchange membrane 82 can be disposed between the first block 101 and a first side of the eluent channel plate 115. The first compartment 113, the first sealing member 121, and the first ion exchange membrane 82 can be assembled together to form a first regenerant channel and fluidically seal the first regenerant channel along the periphery of the first compartment 113. Similarly, the second ion exchange membrane 84 can be disposed between the second block 103 and a second side of the eluent channel plate 115. The second side being on an opposing side to the first side. The second compartment, the second sealing member 153, and the second ion exchange membrane 84 can be assembled together to form a second regenerant channel and fluidically seal the second regenerant channel along the periphery of the second compartment.

The first ion exchange membrane 82, the central cutout portion 136, and the second ion exchange membrane 84 can be sandwiched together to form an eluent channel, hold the eluent screen 146 in the eluent channel, and fluidically seal the eluent channel along the peripheral boundary portion 142. As illustrated in FIG. 1, the first ion exchange membrane 82 is urged against the first side of the eluent channel plate 115 so that the first ion exchange membrane 82 touches a first side of the peripheral boundary portion 142, and the second ion exchange membrane 84 is urged against the second side of the eluent channel plate 115 so that the second ion exchange membrane 84 touches a second side of the peripheral boundary portion 142. The second side of the peripheral boundary portion 142 being on an opposing side to the first side of the peripheral boundary portion 142. In an embodiment, the eluent screen height is in a perpendicular orientation to the plane of the eluent channel plate, the eluent screen height being about equal to the recessed eluent channel plate height H2. In another embodiment, the eluent screen height is within about +/−25% of the recessed eluent channel plate height, preferably about +/−20% of the recessed eluent channel plate height, more preferably about +/−15% of the recessed eluent channel plate height, yet more preferably about +/−10% of the recessed eluent channel plate height, and even yet more preferably about +/−5% of the recessed eluent channel plate height so long as the ion exchange barrier is able to form a fluid seal with the eluent screen and the peripheral boundary portion 142 of the eluent channel plate 215. It should be noted that the eluent screen height can be selected with respect to the recessed eluent channel plate height H2 so that the dispersion of the peaks is within a desired range. The dispersion can be described in plate number (N), which may also be referred to as efficiency. Where the screen height is slightly larger than recessed eluent channel plate height H2, the ion exchange membrane may flex or partially deform to hold the screen in the eluent channel. The screen may also become compressed by the sealing forces. However, where the screen height is slightly smaller than recessed eluent channel plate height H2, the ion exchange may flex or partially deform into or around the notches or protrusions of the eluent channel plate to hold the screen in the eluent channel. It is worthwhile to note that ion exchange materials can swell when wet and that such ion exchange materials can be assembled dry can so that they expand when hydrated. These forces can be used to make a preferred seal of the present embodiment.

The central channel is formed by a sandwich structure of the first ion exchange membrane 82 and second ion exchange membrane 84 with the eluent channel plate 115 in between. The eluent channel plate 115 has two ports 134 and 135 for eluent to be inputted and outputted. The two ports 134 and 135 can each be a small through-hole, represented by two parallel dotted lines on FIG. 2, that traverses through the cylindrical portion 144 and a portion of the eluent channel plate 115 to a vertex 148 of the hexagonal shaped central cutout portion 136. The inlet hole and the outlet hole of the two ports 134 and 135 are both aligned along a longitudinal axis parallel to a plane of the eluent channel plate 115.

In an embodiment, the first block 101 further includes a first groove formed in the first block 101 along the periphery of the first compartment 113. The first sealing member 121 can be disposed in the first groove. The second block 103 further includes a second groove formed in the second block 103 along the periphery of the second compartment and the second sealing member 153 is disposed in the second groove. The first groove and second groove can both be configured to correspond to the shape of the first sealing member 121 and the second sealing member 153.

The eluent screen can be sealed in the suppressor described herein and provides excellent performance in terms of peak efficiency and peak asymmetry. The suppressors described herein are suitable for both chemical and electrolytic suppressor devices as shown in the examples. The excellent peak shapes and efficiencies also illustrate that the devices described herein have a relatively low void volume and relatively low band dispersion. In an embodiment, an intended use of the suppressors with ion chromatography described herein is to remove 90% or more of the eluent counterions, preferably 95% or more of the eluent counterions, and more preferably 99% or more of the eluent counterions.

In an embodiment, the suppressors described herein may be used as a sample pretreatment device where such a device is installed downstream of the sample injector and upstream of a chromatography column. A sample pretreatment device can remove matrix ions from a sample containing analyte and matrix ions in which the matrix ion can interfere with the chromatographic separation or detection.

The suppressor devices disclosed herein describe the use of 3 channels. In an alternative embodiment, additional channels can be added by so that the devices can include 4 or more channels. Such devices may be constructed by adding additional layers that can form multiply sealed fluidic channels (e.g., 4 channel device).

In an alternative embodiment, a gasketed screen (e.g., elastomeric screen layer) may be used for each the first and second regenerant channel. The elastomeric layer has a first cutout. A screen can be integrated into the elastomeric layer where the screen spans at least the cutout. An elastomeric layer that is a relatively flat sheet can be cut so that that it has a cutout area such as for example a hexagonal shape. The screen should span the entire cutout area and may be pressed into the elastomeric layer so that the screen is integrated into the elastomeric area. The gasketed screen helps seal and form the regenerant channel while also providing a screen immobilized into the regenerant channel. Where gasket screens are used, the first and second block do not require a recessed area since the gasketed screens provide a perimeter wall for the regenerant flow channel. It should be noted that the gasketed screens are relatively easy to assemble since multiple layers can be pressed closely with ion exchange membranes to create a seal.

The following will describe a method of suppressing an eluent stream using a suppressor as described herein. A sample can contain one or more analytes of interest along with matrix ions. The sample is injected into a chromatography column to be separated so that the one or more analytes and matrix ions elute off of the chromatography column and flow into the suppressor. The eluent stream includes an eluent and at least one analyte. The eluent includes an eluent ion (e.g., OH$^-$ or H$_3$O$^+$) and an eluent counterion (e.g., K$^+$ or MSA$^-$). The method includes flowing the eluent stream through the eluent channel of the suppressor. An aqueous stream can flow through the first regenerant channel and the second regenerant channel. In an embodiment, the aqueous stream can be water or tetrabutylammonium hydroxide. At least a portion of the eluent counterions (e.g., K$^+$ in anion analysis) can be transferred, but not the analyte from the eluent channel to the first regenerant channel. A regenerant ion (e.g., H$_3$O$^+$ in anion analysis) from the second regenerant channel can be concomitantly transferred from the second regenerant channel to the eluent channel. The transferred regenerant ion H$_3$O$^+$ in the central channel can neutralize the eluent ion OH$^-$ and acidify the analyte anion to a more conductive form for improved detection For an electrolytic suppressor, it includes a first electrode and a second electrode. A voltage or a current can be applied between the first electrode and the second electrode. The applied voltage or current creates an electric field that urges the transport of ions across the ion exchange membranes. In addition, the applied voltage or current are of a sufficient magnitude to cause electrolysis of water. At the anode, water is split into $H_3O^+$ ion and oxygen gas. As the cathode, water is split into $OH^-$ and hydrogen gas. The applied voltage or current may range from 2 volts to 12 volts or 1 milliamperes to 2 amperes, respectively.

Example 1—Chromatograms of Standard Solution Containing the Anions Fluoride, Chloride, and Sulfate An anion exchange chromatography column IonPac AS15 (4×250 mm) was installed into a Thermo Scientific Dionex ICS-5000+ ion chromatography system (commercially available from Thermo Fisher Scientific, Sunnyvale, Calif.). A pump was used to pump deionized water into a Thermo Scientific Dionex EGC 500 KOH cartridge (Thermo Fisher Scientific, Sunnyvale, Calif.) for generating a KOH eluent. The column was placed in a thermal compartment that was operated at room temperature at around 25° C. An anion suppressor (4 mm) was used in accordance with FIGS. 1-3 or another anion reference suppressor (4 mm) was used that had ion exchange resin placed in the central eluent channel. The suppressor was installed downstream of the chromatography column and upstream of a Thermo Scientific conductivity detector (CD). The suppressors were powered by an internal power supply and operated at a constant current setting of 180 mA. The chromatography was pursued at a flow rate of 1.2 mL/min. The eluent comprised of potassium hydroxide and was generated from the eluent generator at a concentration of 38 mM. The injection volume was 25 μL. The chromatograms were run using a standard mixture of fluoride (2 mg/L), chloride (5 mg/L), and sulfate (10 mg/L).

Figure 5:
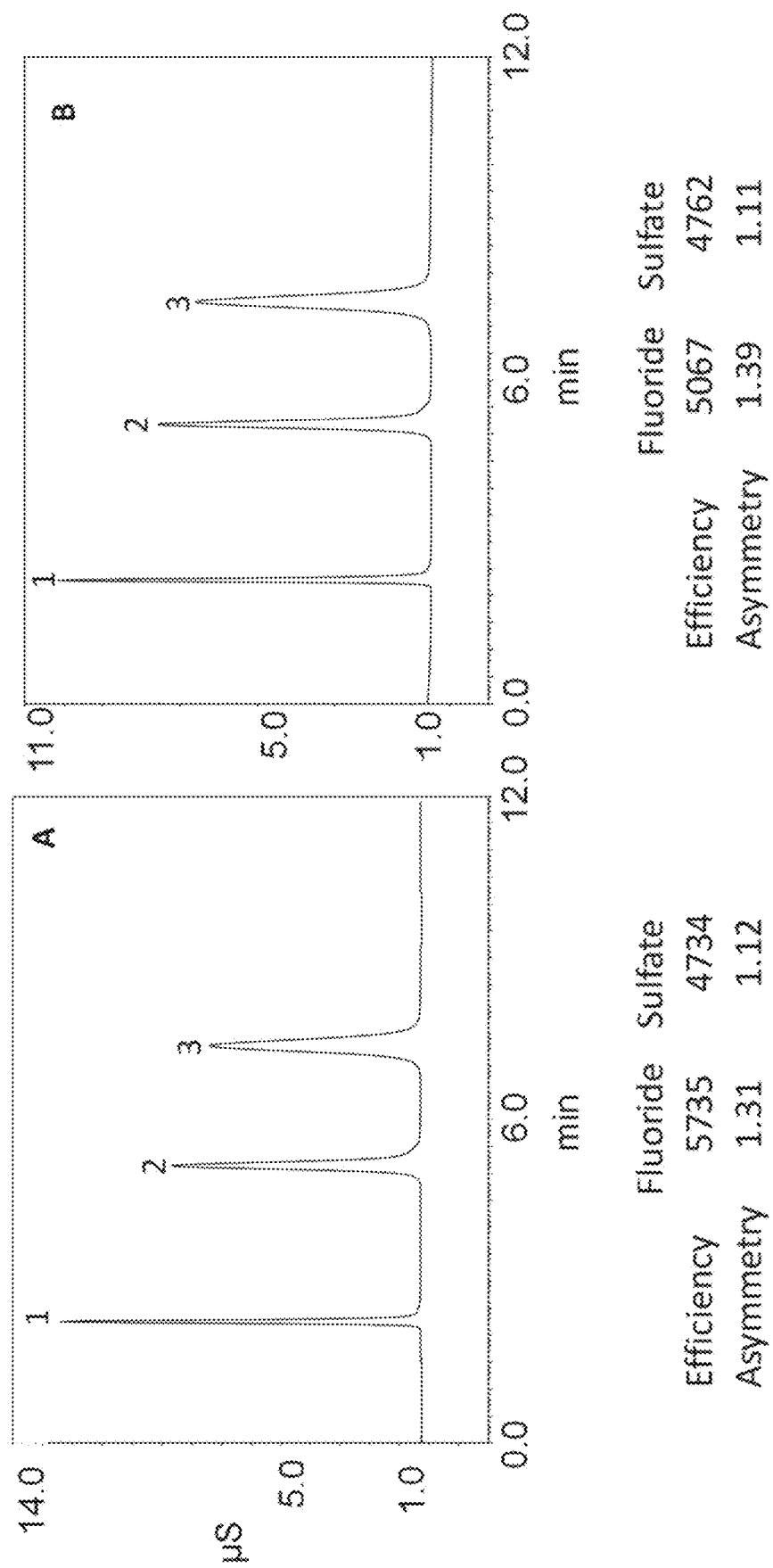
FIG. 5 shows two chromatograms that analyze the anions fluoride and sulfate comparing the use of an electrolytic anion suppressor in a format similar to FIG. 1 (see chromatogram A) compared to a reference electrolytic suppressor with ion exchange resin in the central channel (see chromatogram B).

FIG. 5 shows a comparison of the two chromatograms for the above analysis and compares the use of the anion suppressor in the format similar to FIG. 1 (see chromatogram A) with that of a reference suppressor with ion exchange resin that was packed in the central channel (see chromatogram B). The results indicated good peak shapes for both chromatograms A and B, where peak 1 is fluoride, peak 2 is chloride, and peak 3 is sulfate. The peak efficiency for the suppressors using a screen showed a 11% increase for fluoride when compared with the peak efficiency generated with the suppressor with ion exchange resin in the central channel. The asymmetry for the suppressors using screens was improved by 6% for fluoride compared to the reference suppressor with ion exchange resin in the central channel. The increased peak efficiency of the early eluting peak fluoride was a good indicator of the band dispersion within the suppressor eluent channel. The above results indicated excellent performance of the suppressor with screens in the central channel used for chromatogram A. The later eluting peaks which were chloride and sulfate would be less impacted by the band dispersion and this was observed and the peak efficiencies were roughly comparable for the two suppressors, chromatograms labeled A and B.

Example 2—Chromatograms of Standard Solution Containing Nine Anions

An anion exchange chromatography column IonPac AS19 (4×250 mm) was installed into a Thermo Scientific Dionex ICS-5000+ ion chromatography system (commercially available from Thermo Fisher Scientific, Sunnyvale, Calif.). A pump was used to pump deionized water into a Thermo Scientific Dionex EGC 500 KOH cartridge (Thermo Fisher Scientific, Sunnyvale, Calif.) for generating a KOH eluent. The column was placed in a thermal compartment that was operated at room temperature at around 30° C. An anion suppressor (4 mm) was used in accordance with FIGS. 1-3 or another anion reference suppressor (4 mm) was used that had ion exchange resin placed in the central eluent channel. The suppressor was installed downstream of the chromatography column and upstream of a Thermo Scientific conductivity detector (CD). The suppressors were powered by an internal power supply and operated at a constant current setting of 50 mA. The chromatography was pursued at a flow rate of 1.0 mL/min. The eluent comprised of potassium hydroxide and was generated from the eluent generator at a concentration of 20 mM. The injection volume was 10 μL.

The chromatography conditions are summarized in Table 1 below.

TABLE 1

| | |
|---|---|
| Chromatography Column: | IonPac AS19 4 μm 4-mm |
| Eluent: | 20 mM KOH |
| Flow Rate: | 1.0 ml/min |
| Temp: | 30° C. |
| Suppressor Current: | 50 mA |
| Inj loop: | 10 μL |

The chromatography column had a diameter of 4 mm and a packed bed of particles having a 4 micron diameter particles. The chromatograms were run using a standard solution of nine anions listed in Table 2 below.

TABLE 2

| Peak No. | Analyte | Concentration (mg/L) |
|---|---|---|
| 1 | Fluoride | 3 |
| 2 | Chlorite | 10 |
| 3 | Bromate | 20 |
| 4 | Chloride | 6 |
| 5 | Nitrite | 15 |
| 6 | Chlorate | 25 |
| 7 | Bromide | 25 |
| 8 | Nitrate | 25 |
| 9 | Sulfate | 30 |

Figure 6:
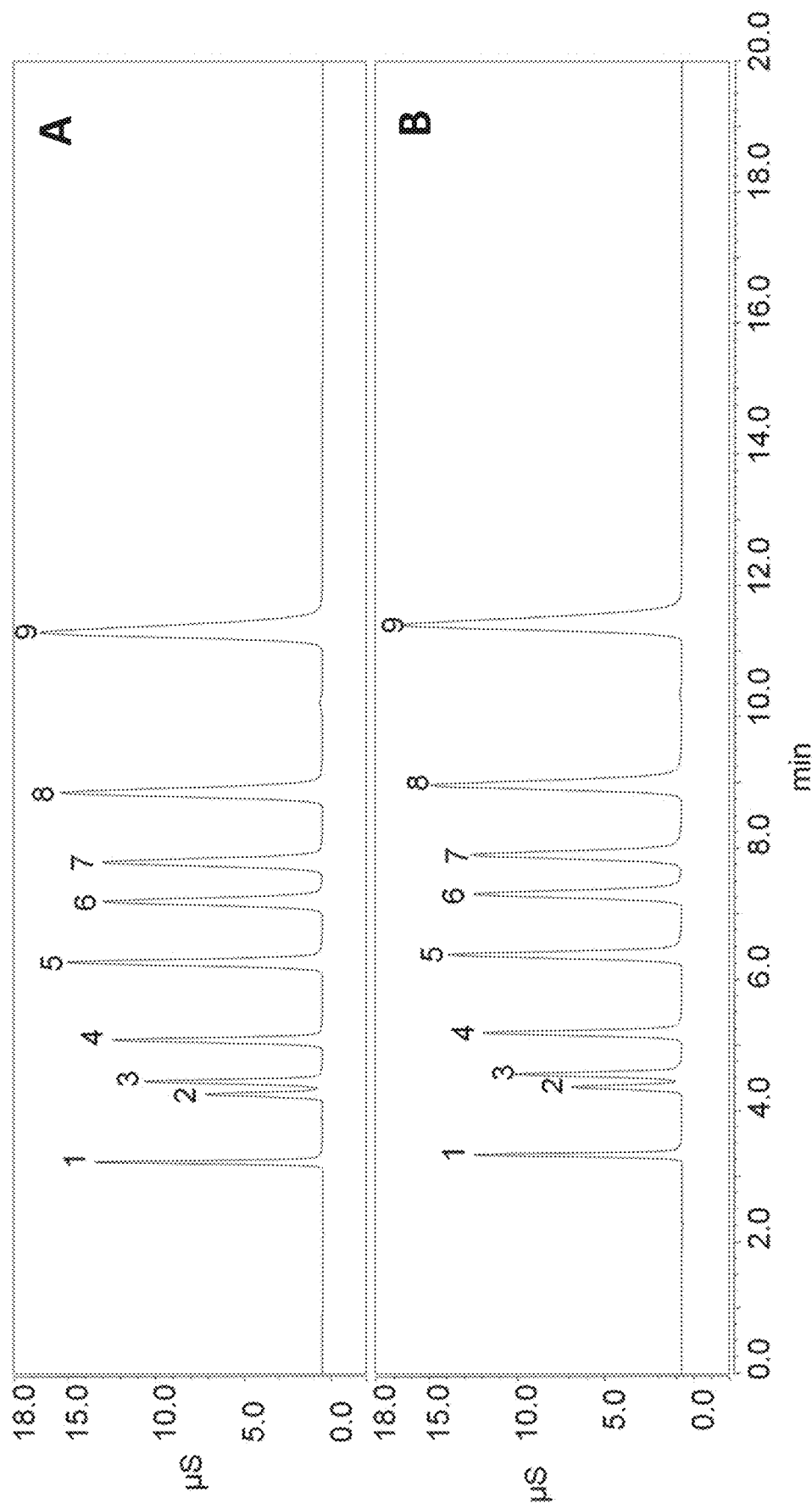
FIG. 6 shows two chromatograms that analyze nine anions comparing the use of an electrolytic anion suppressor in a format similar to FIG. 1 (see chromatogram A) compared to the reference electrolytic suppressor with ion exchange resin in the central channel (see chromatogram B).

FIG. 6 shows the analysis of a standard solution containing nine anions comparing the use of an anion suppressor in the format similar to FIG. 1 (see chromatogram A) compared to a suppressor with ion exchange resin in the central channel (see chromatogram B). The peak efficiency and asymmetry for chromatogram A showed relatively improved performance as before for the early eluting peaks when compared to chromatogram B, as shown in Table 3. These results indicate as before that the suppressor for chromatogram A is suitable for suppression and for analyzing peaks with a high efficiency column such as the 4 μm packed column shown in this example.

TABLE 3

| | Chromatogram A | | Chromatogram B | |
|---|---|---|---|---|
| Peak No. | Plates | Asym. | Plates | Asym. |
| 1 | 17975 | 1 | 16230 | 0.99 |
| 2 | 19472 | 0.97 | 18864 | 0.98 |
| 3 | 19280 | 0.94 | 18732 | 0.94 |
| 4 | 20303 | 0.98 | 19829 | 0.95 |
| 5 | 19238 | 0.99 | 17914 | 0.97 |
| 6 | 19620 | 1.04 | 19218 | 1.03 |
| 7 | 20390 | 1.05 | 20041 | 1.04 |

TABLE 3-continued

| | Chromatogram A | | Chromatogram B | |
|---|---|---|---|---|
| Peak No. | Plates | Asym. | Plates | Asym. |
| 8 | 19805 | 1.13 | 19396 | 1.13 |
| 9 | 17329 | 1.36 | 17371 | 1.35 |

Example 3—Chromatograms of Standard Solution Containing the Cations Lithium and Potassium A cation exchange chromatography column IonPac CS12A (4×250 mm) was installed into a Thermo Scientific Dionex ICS-5000+ ion chromatography system (commercially available from Thermo Fisher Scientific, Sunnyvale, Calif.). A pump was used to pump deionized water into a Thermo Scientific Dionex EGC 500 MSA cartridge (Thermo Fisher Scientific, Sunnyvale, Calif.) for generating a methane sulfonic acid (MSA) eluent. The column was placed in a thermal compartment that was operated at room temperature at around 25° C. A cation suppressor (4 mm) was used in accordance with FIGS. 1-3 or another cation reference suppressor (4 mm) was used that had ion exchange resin placed in the central eluent channel. The suppressor was installed downstream of the chromatography column and upstream of a Thermo Scientific conductivity detector (CD). The suppressors were powered by an internal power supply and operated at a constant current setting of 59 mA. The chromatography was pursued at a flow rate of 1.0 mL/min. The eluent comprised of methane sulfonic acid and was generated from the eluent generator at a concentration of 20 mM. The injection volume was 25 μL. Lithium (0.5 mg/L) and potassium (5 mg/L) standards were prepared at the concentrations indicated for this test.

Figure 7:
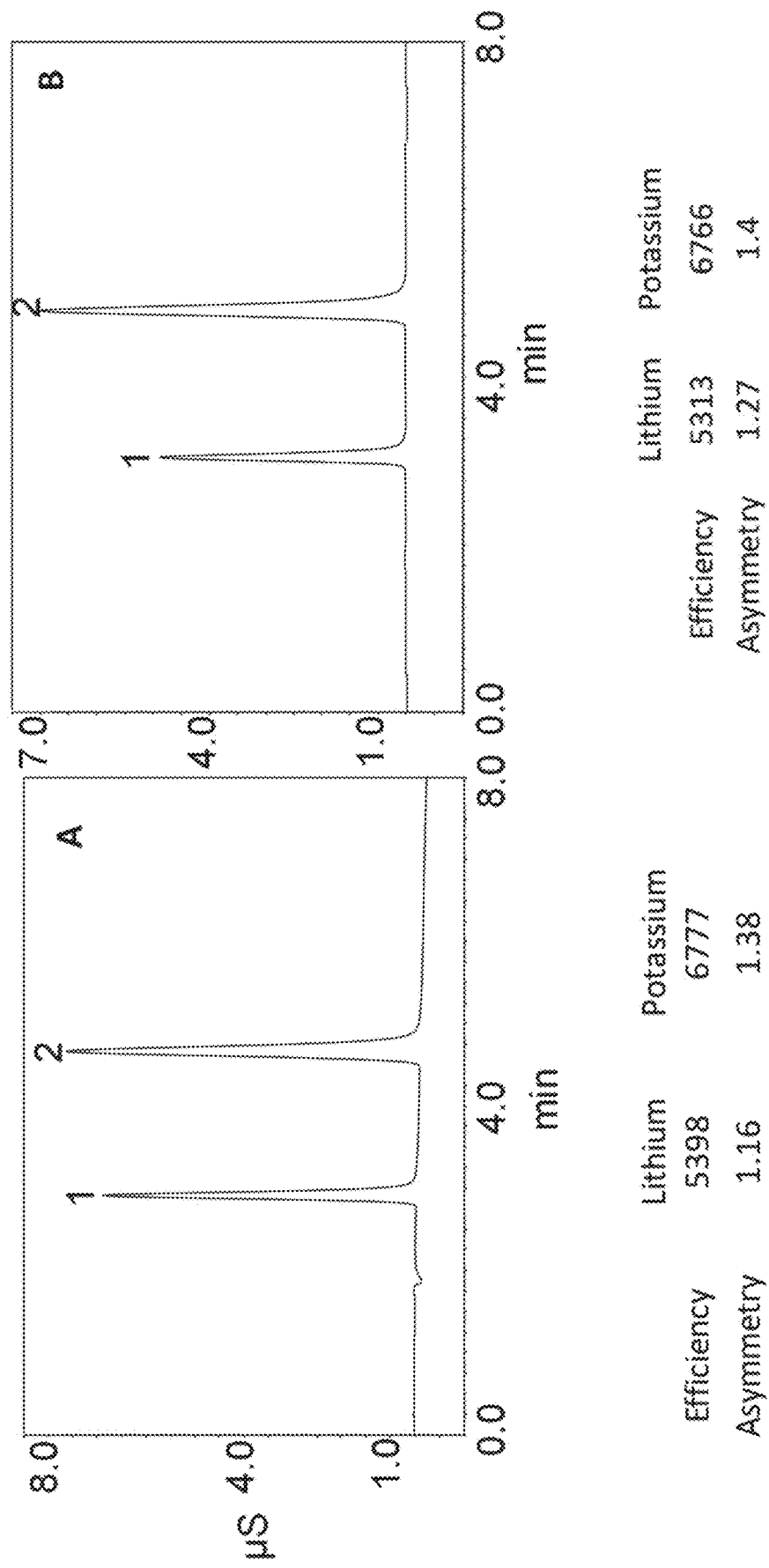
FIG. 7 shows two chromatograms that analyze the cations lithium and potassium comparing the use of an electrolytic cation suppressor in a format similar to FIG. 1 (see chromatogram A) compared to the reference electrolytic suppressor with ion exchange resin in the central channel (see chromatogram B).

FIG. 7 shows the analysis of lithium and potassium standards comparing the use of a cation suppressor in the format similar to FIG. 1 (see chromatogram A) compared to a reference suppressor with ion exchange resin in the central channel (see chromatogram B). The peak efficiency and asymmetry for chromatogram A showed relatively improved performance compared to chromatogram B for the early eluting lithium peak (peak 1). The potassium peak 2 performance was comparable between the two suppressors. These results indicated that the suppressor used in chromatogram A was operating well and yielding good results.

Example 4—Chromatograms of Standard Solution Containing Six Cations

A cation exchange chromatography column IonPac CS16 (4×250 mm) was installed into a Thermo Scientific Dionex ICS-5000+ ion chromatography system (commercially available from Thermo Fisher Scientific, Sunnyvale, Calif.). A pump was used to pump deionized water into a Thermo Scientific Dionex EGC 500 MSA cartridge (Thermo Fisher Scientific, Sunnyvale, Calif.) for generating a methane sulfonic acid eluent. The column was placed in a thermal compartment that was operated at room temperature at around 40° C. A cation suppressor (4 mm) was used in accordance with FIGS. 1-3 or another cation reference suppressor (4 mm) was used that had ion exchange resin placed in the central eluent channel. The suppressor was installed downstream of the chromatography column and upstream of a Thermo Scientific conductivity detector (CD). In contrast to Examples 1-3 that used electrolytic suppressors where a current was applied between two electrodes, this example used a chemical suppressor format where a regenerant fluid of 100 mM TBAOH (tetrabutylammonium hydroxide) was pumped through both of the regenerant channels. The chromatography was pursued at a flow rate of 0.64 mL/min. The eluent comprised of methane sulfonic acid and was generated from the eluent generator at a concentration of 30 mM. The injection volume was 10 μL.

The chromatography system was run using the summarized conditions listed in Table 4 below.

TABLE 4

| | |
|---|---|
| Column: | IonPac CS16, 4 mm 4μ column |
| Eluent: | 30 mM MSA (EG) |
| Regenerant: | 100 mM TBAOH |
| Flow rate: | 0.64 ml/min |
| Loop size: | 10 μl |
| Oven Temp: | 40° C. |

The chromatography column had a diameter of 4 mm and a packed bed of particles having a 4 micron diameter particles. The chromatograms were run using a standard solution of six cations listed in Table 5 below.

TABLE 5

| Analyte | Concentration (mg/L) |
|---|---|
| Lithium | 0.5 |
| Sodium | 2.0 |
| Ammonium | 2.5 |
| Potassium | 5.0 |
| Magnesium | 2.5 |
| Calcium | 5.0 |

FIG. 8 shows two chromatograms that analyze a standard solution containing six cations comparing the use of a cation suppressor (in the format similar to FIG. 1 (see chromatogram A) compared to a suppressor with ion exchange resin in the central channel (see chromatogram B). The background conductivity was 0.3 μS/cm and the average noise was 0.29 nS/cm indicating that suppression was sufficiently complete. The peak efficiency for the early eluting peaks of chromatogram A showed relatively improved performance compared to chromatogram B, as shown in Table 6. These results demonstrate that the suppressor for chromatogram A is suitable as a suppressor for ion chromatography applications.

TABLE 6

| Peak No. | Analyte | Chromatogram B Plates | Chromatogram A Plates |
|---|---|---|---|
| 1 | Lithium | 11118 | 12803 |
| 2 | Sodium | 14041 | 14794 |
| 3 | Ammonium | 10633 | 12612 |
| 4 | Potassium | 13734 | 13661 |
| 5 | Magnesium | 13334 | 13147 |
| 6 | Calcium | 14435 | 14069 |

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A suppressor for use in reducing a background signal while detecting analytes in a liquid sample for ion chromatography, the suppressor comprising:
   A) a first block including:
      i) a first compartment;
      ii) a first sealing member disposed along a periphery of the first compartment;
      iii) a first screen disposed in the first compartment;
      iv) a first inlet; and
      v) a first outlet;
   B) a first ion exchange membrane capable of passing ions of only one charge, positive or negative, and of blocking a bulk liquid flow;
   C) an eluent channel plate including:
      i) a plate portion extending between two cylindrical portions, the plate portion including a central cutout portion and a peripheral boundary portion extending within the central cutout portion, the peripheral boundary portion including two or more notches or protrusions, in which the eluent channel plate includes an eluent channel plate height H1 and the peripheral boundary portion includes a recessed eluent channel plate height H2 less than the eluent channel plate height H1, in which the eluent channel plate height H1 and the recessed eluent channel plate height H2 are in a perpendicular orientation to a plane of the plate portion;
      ii) an eluent screen disposed in the central cutout portion, in which a peripheral border of the eluent screen has two or more corresponding notches or corresponding protrusions to the eluent channel plate;
      iii) an inlet hole located at a first end face of the eluent channel plate, in which the inlet hole is fluidically connected to the central cutout portion; and
      iv) an outlet hole located at a second end face of the eluent channel plate, in which the outlet hole is fluidically connected to the central cutout portion;
   D) a second ion exchange membrane capable of passing ions of only one charge, positive or negative, and of blocking a bulk liquid flow, in which the first ion exchange membrane and the second ion exchange membrane have a same charge; and
   E) a second block including:
      i) a second compartment;
      ii) a second sealing member disposed along a periphery of the second compartment;
      iii) a second screen disposed in the second compartment;
      iv) a second inlet; and
      v) a second outlet;
   in which the first ion exchange membrane is disposed between the first block and a first side of the eluent channel plate; in which the first compartment, the first sealing member, and the first ion exchange membrane form a first regenerant channel and fluidically seal the first regenerant channel along the periphery of the first compartment;
   in which the second ion exchange membrane is disposed between the second block and a second side of the eluent channel plate, the second side of the eluent channel plate being on an opposing side to the first side of the eluent channel plate; in which the second compartment, the second sealing member, and the second ion exchange membrane form a second regenerant channel and fluidically seal the second regenerant channel along the periphery of the second compartment; and
   in which the first ion exchange membrane, the central cutout portion, and the second ion exchange membrane are sandwiched together to form an eluent channel, hold the eluent screen in the eluent channel, and fluidically seal the eluent channel along the peripheral boundary portion.

2. The suppressor of claim 1, in which the first ion exchange membrane is urged against the first side of the eluent channel plate so that the first ion exchange membrane touches a first side of the peripheral boundary portion, and the second ion exchange membrane is urged against the second side of the eluent channel plate so that the second ion exchange membrane touches a second side of the peripheral boundary portion, the second side of the peripheral boundary portion being on an opposing side to the first side of the peripheral boundary portion.

3. The suppressor of claim 2, in which the first ion exchange membrane touches the peripheral boundary portion and the corresponding notches or the corresponding protrusions of the eluent screen, and the second ion exchange membrane touches the peripheral boundary portion and the corresponding notches or the corresponding protrusions of the eluent screen.

4. The suppressor of claim 1, in which the eluent screen has an eluent screen height in the perpendicular orientation to the plane of the eluent channel plate, the eluent screen height being about equal to the recessed eluent channel plate height.

5. The suppressor of claim 1, in which the first block further includes a first groove formed in the first block along the periphery of the first compartment and the first sealing member is disposed in the first groove, and the second block further includes a second groove formed in the second block along the periphery of the second compartment and the second sealing member is disposed in the second groove.

6. The suppressor of claim 1, in which the inlet hole and the outlet hole are both aligned along a longitudinal axis parallel to the plane of the eluent channel plate.

7. The suppressor of claim 1, in which the first sealing member is a first o-ring and the second sealing member is a second o-ring.

8. The suppressor of claim 7, in which the first o-ring and the second o-ring are both formed from a first elastomeric cord and a second elastomeric cord, respectively.

9. The suppressor of claim 8, in which the periphery of the first compartment comprises a first plurality of pins configured to pierce and immobilize the first elastomeric cord, and the periphery of the second compartment comprises a second plurality of pins configured to pierce and immobilize the second elastomeric cord.

10. The suppressor of claim 1, in which the first block further includes a first electrode disposed in the first compartment, and the second block further includes a second electrode disposed in the second compartment.

11. A suppressor for use in reducing a background signal while detecting analytes in a liquid sample for ion chromatography, the suppressor comprising:
- A) a first block including an inlet and an outlet;
- B) a first elastomeric screen layer comprising a first elastomeric layer having a first cutout; a first screen integrated into the first elastomeric layer where the first screen spans at least the first cutout;
- C) a first ion exchange membrane capable of passing ions of only one charge, positive or negative, and of blocking a bulk liquid flow;
- D) an eluent channel plate including:
  - i) a plate portion extending between two cylindrical portions, the plate portion including a central cutout portion and a peripheral boundary portion extending within the central cutout portion, the peripheral boundary portion including two or more notches or protrusions, in which the eluent channel plate includes an eluent channel plate height H1 and the peripheral boundary portion includes a recessed eluent channel plate height H2 less than the eluent channel plate height H1 in which the eluent channel plate height H1 and the recessed eluent channel plate height H2 are in a perpendicular orientation to a plane of the plate portion;
  - ii) an inlet hole located at a first end face of the eluent channel plate, in which the inlet hole is fluidically connected to the central cutout portion;
  - iii) an outlet hole located at a second end face of the eluent channel plate, in which the outlet hole is fluidically connected to the central cutout portion;
  - iv) an eluent screen disposed in the central cutout portion, in which a peripheral border of the eluent screen has two or more corresponding notches or corresponding protrusions to the eluent channel plate;
- E) a second ion exchange membrane capable of passing ions of only one charge, positive or negative, and of blocking a bulk liquid flow, in which the first ion exchange membrane and the second ion exchange membrane have a same charge;
- F) a second elastomeric screen layer comprising a second elastomeric layer having a second cutout; a second screen integrated into the second elastomeric layer where the second screen spans at least the second cutout;
- G) a second block including an inlet and an outlet,
- in which the first ion exchange membrane is disposed between the first elastomeric screen layer and a first side of the eluent channel plate, in which the first block, the first elastomeric screen layer, and the first ion exchange membrane form a first regenerant channel and fluidically seal the first regenerant channel along a periphery of the first cutout;
- in which the second ion exchange membrane is disposed between the second elastomeric screen layer and a second side of the eluent channel plate, the second side of the eluent channel plate being on an opposing side to the first side of the eluent channel plate, in which the second block, the second elastomeric screen layer, and the second ion exchange membrane form a second regenerant channel and fluidically seal the second regenerant channel along a periphery of the second cutout; and
- in which the first ion exchange membrane, the central cutout portion, and the second ion exchange membrane form an eluent channel, hold the eluent screen in the eluent channel, and fluidically seal the eluent channel along the peripheral boundary portion.

12. The suppressor of claim 11 further comprising:
- H) a first electrode disposed against the first block, in which the first elastomeric screen layer is disposed against the first electrode; and
- I) a second electrode disposed against the second block, in which the second elastomeric screen layer is disposed against the second electrode.

13. A method of suppressing an eluent stream using a suppressor, the eluent stream comprising an eluent and an analyte, in which the eluent comprises an eluent ion and an eluent counterion, the suppressor comprising
- A) a first block including:
  - i) a first compartment;
  - ii) a first sealing member disposed along a periphery of the first compartment;
  - iii) a first screen disposed in the first compartment;
  - iv) a first inlet; and
  - v) a first outlet;
- B) a first ion exchange membrane capable of passing ions of only one charge, positive or negative, and of blocking a bulk liquid flow;
- C) an eluent channel plate including:
  - i) a plate portion extending between two cylindrical portions, the plate portion including a central cutout portion and a peripheral boundary portion extending within the central cutout portion, the peripheral boundary portion including two or more notches or protrusions, in which the eluent channel plate includes an eluent channel plate height H1 and the peripheral boundary portion includes a recessed eluent channel plate height H2 less than the eluent channel plate height H1, in which the eluent channel plate height H1 and the recessed eluent channel plate height H2 are in a perpendicular orientation to a plane of the plate portion;
  - ii) an eluent screen disposed in the central cavity, in which a peripheral border of the eluent screen has two or more corresponding notches or corresponding protrusions to the eluent channel plate,
  - iii) an inlet hole located at a first end face of the eluent channel plate, in which the inlet hole is fluidically connected to the central cutout portion; and
  - iv) an outlet hole located at a second end face of the eluent channel plate, in which the outlet hole is fluidically connected to the central cutout portion;
- D) a second ion exchange membrane capable of passing ions of only one charge, positive or negative, and of blocking a bulk liquid flow, in which the first ion exchange membrane and the second ion exchange membrane have a same charge;
- E) a second block including:
  - i) a second compartment;
  - ii) a second sealing member disposed along a periphery of the second compartment;
  - iii) a second screen disposed in the second compartment;
  - iv) a second inlet; and
  - v) a second outlet;
- in which the first ion exchange membrane is disposed between the first block and a first side of the eluent channel plate; in which the first compartment, the first sealing member, and the first ion exchange membrane form a first regenerant channel and fluidically seal the first regenerant channel along the periphery of the first compartment;

in which the second ion exchange membrane is disposed between the second block and a second side of the eluent channel plate, the second side of the eluent channel plate being on an opposing side to the first side of the eluent channel plate; in which the second compartment, the second sealing member, and the second ion exchange membrane form a second regenerant channel and fluidically seal the second regenerant channel along the periphery of the second compartment; and in which the first ion exchange membrane, the central cutout portion, and the second ion exchange membrane are sandwiched together to form an eluent channel, hold the eluent screen in the eluent channel, and fluidically seal the eluent channel along the peripheral boundary portion, the method comprising:

flowing the eluent stream through the eluent channel and the eluent screen, wherein the eluent screen is affixed relative to the eluent channel plate by engagement of the two or more notches or protrusions of the peripheral boundary portion with the two or more corresponding notches or corresponding protrusions of the eluent screen;

flowing an aqueous stream through the first regenerant channel and the second regenerant channel;

transferring at least a portion of the eluent counterion, but not the analyte from the eluent channel to the first regenerant channel; and concomitantly transferring a regenerant ion from the second regenerant channel to the eluent channel.

14. The method of claim 13, in which the first block further includes a first electrode disposed in the first compartment, and the second block further includes a second electrode disposed in the second compartment, the method further comprising:

applying a voltage or a current between the first electrode and the second electrode.

\* \* \* \* \*